United States Patent
Chen et al.

(10) Patent No.: US 12,494,051 B2
(45) Date of Patent: Dec. 9, 2025

(54) APPARATUS FOR PERFORMING FILTER PROCESSING USING CONVOLUTION OPERATION, METHOD OF PERFORMING FILTER PROCESSING, AND MEDIUM

(71) Applicant: CANON KABUSHIKI KAISHA, Tokyo (JP)

(72) Inventors: Tsewei Chen, Tokyo (JP); Masami Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 533 days.

(21) Appl. No.: 18/055,603

(22) Filed: Nov. 15, 2022

(65) Prior Publication Data

US 2023/0154174 A1    May 18, 2023

(30) Foreign Application Priority Data

Nov. 16, 2021    (JP) ................................ 2021-186520

(51) Int. Cl.
*G06V 10/82*    (2022.01)
*G06F 7/544*    (2006.01)

(52) U.S. Cl.
CPC ............ *G06V 10/82* (2022.01); *G06F 7/5443* (2013.01)

(58) Field of Classification Search
None
See application file for complete search history.

(56) References Cited

U.S. PATENT DOCUMENTS

| | | | | |
|---|---|---|---|---|
| 9,818,059 | B1* | 11/2017 | Woo | G06N 3/063 |
| 2019/0114532 | A1* | 4/2019 | Sunwoo | G06T 5/60 |
| 2019/0147324 | A1* | 5/2019 | Martin | G06N 3/063 |
| 2025/0130773 | A1* | 4/2025 | Chen | G06F 7/523 |

FOREIGN PATENT DOCUMENTS

JP    2020500365 A    1/2020

* cited by examiner

*Primary Examiner* — Dov Popovici
(74) *Attorney, Agent, or Firm* — Canon U.S.A., Inc. IP Division

(57) ABSTRACT

An apparatus for performing filter processing on a data array in a processing target block of a predetermined size is provided. A data memory holds the data array in the processing target block. A coefficient memory holds weight coefficients of a filter used for the filter processing. A controller determines, in a determination, whether data in a reference region in the processing target block, set in correspondence with the processing target block, are zero values. A processor generates a convolution operation result of the weight coefficients and data at a plurality of positions in the processing target block. The controller controls, based on a result of the determination, whether to perform at least some of multiply-accumulate operations of the data and the weight coefficients when the processor generates the convolution operation result.

19 Claims, 15 Drawing Sheets

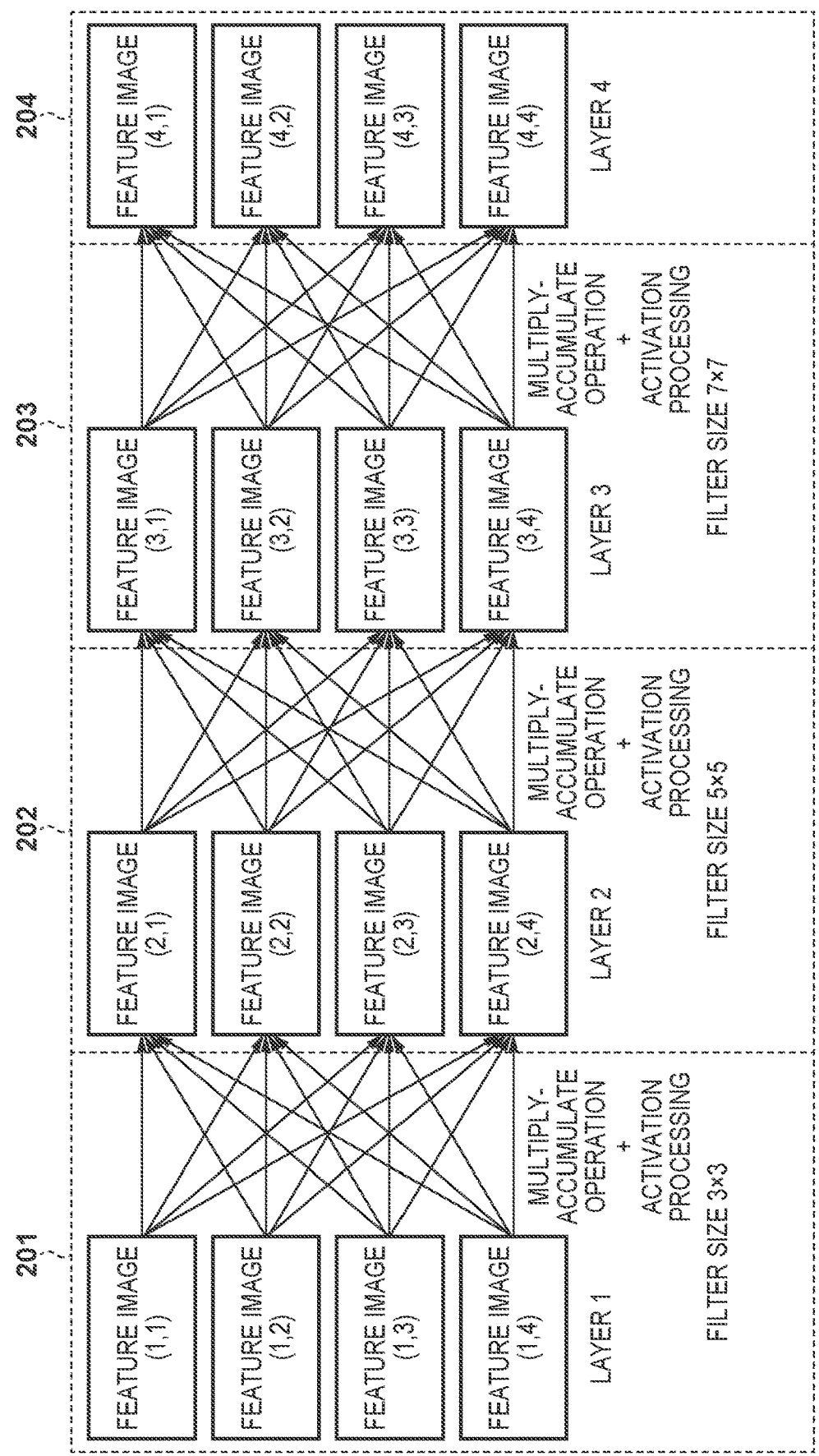

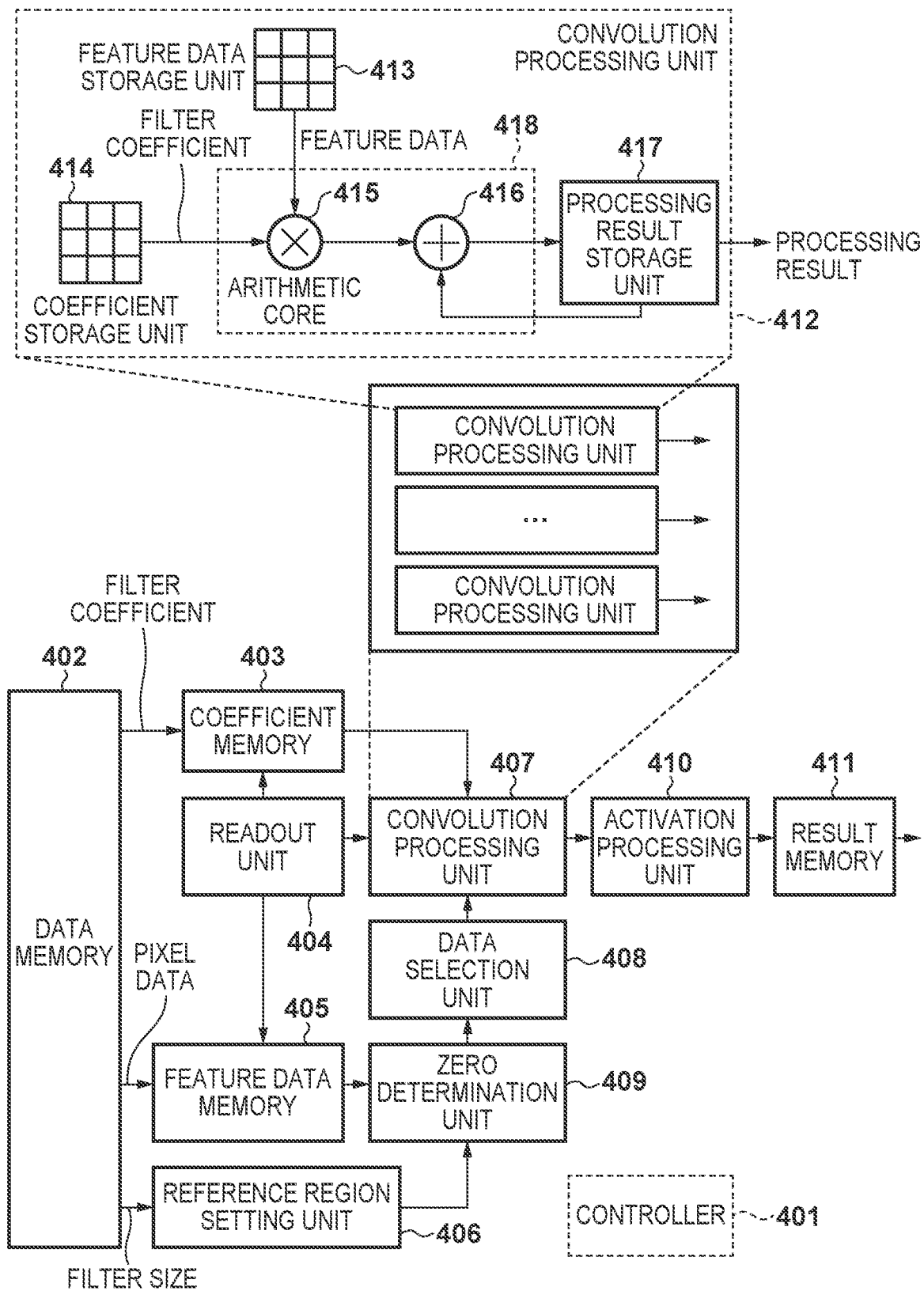

602 — KERNEL 1
| 1 | 2 | 3 |
|---|---|---|
| 6 | 7 | 8 |
| 11 | 12 | 13 |

603 — KERNEL 2
| 2 | 3 | 4 |
|---|---|---|
| 7 | 8 | 9 |
| 12 | 13 | 14 |

604 — KERNEL 3
| 3 | 4 | 5 |
|---|---|---|
| 8 | 9 | 10 |
| 13 | 14 | 15 |

605 — KERNEL 4
| 6 | 7 | 8 |
|---|---|---|
| 11 | 12 | 13 |
| 16 | 17 | 18 |

606 — KERNEL 5
| 7 | 8 | 9 |
|---|---|---|
| 12 | 13 | 14 |
| 17 | 18 | 19 |

607 — KERNEL 6
| 8 | 9 | 10 |
|---|---|---|
| 13 | 14 | 15 |
| 18 | 19 | 20 |

608 — KERNEL 7
| 11 | 12 | 13 |
|---|---|---|
| 16 | 17 | 18 |
| 21 | 22 | 23 |

609 — KERNEL 8
| 12 | 13 | 14 |
|---|---|---|
| 17 | 18 | 19 |
| 22 | 23 | 24 |

610 — KERNEL 9
| 13 | 14 | 15 |
|---|---|---|
| 18 | 19 | 20 |
| 23 | 24 | 25 |

FIG. 7A
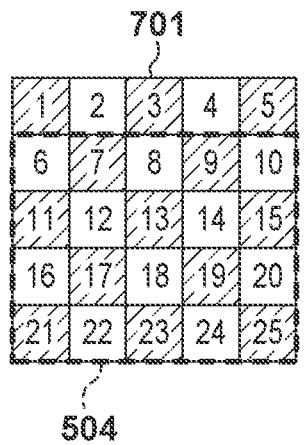
FIG. 7B
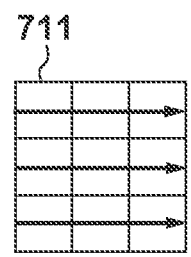
FIG. 7C
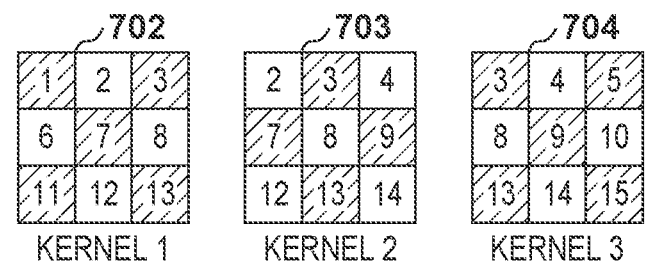
KERNEL 1    KERNEL 2    KERNEL 3
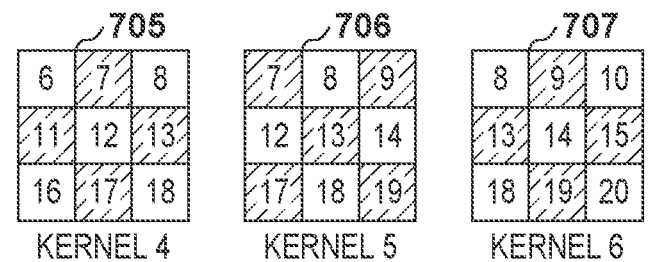
KERNEL 4    KERNEL 5    KERNEL 6
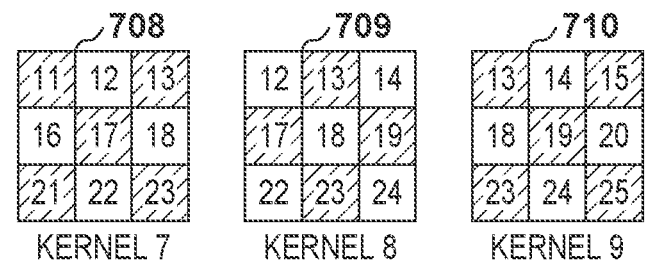
KERNEL 7    KERNEL 8    KERNEL 9

```
        1101
      ┌─┬─┬─┬─┬─┐
      │1│2│3│4│5│
      ├─┼─┼─┼─┼─┤
      │6│7│8│9│10│
      ├─┼─┼─┼─┼─┤
      │11│12│13│14│15│
      ├─┼─┼─┼─┼─┤
      │16│17│18│19│20│
      ├─┼─┼─┼─┼─┤
      │21│22│23│24│25│
      └─┴─┴─┴─┴─┘
    1121
```

```
        1101
      ┌─┬─┬─┬─┬─┐
      │1│2│3│4│5│
      ├─┼─┼─┼─┼─┤
      │6│7│8│9│10│
      ├─┼─┼─┼─┼─┤
      │11│12│13│14│15│
      ├─┼─┼─┼─┼─┤
      │16│17│18│19│20│
      ├─┼─┼─┼─┼─┤
      │21│22│23│24│25│
      └─┴─┴─┴─┴─┘
    1122
```

US 12,494,051 B2

APPARATUS FOR PERFORMING FILTER PROCESSING USING CONVOLUTION OPERATION, METHOD OF PERFORMING FILTER PROCESSING, AND MEDIUM

BACKGROUND

Technical Field

One disclosed aspect of the embodiments relates to an apparatus, an information processing method, and a program and, more particularly, to operation processing using convolutional neural networks.

Description of the Related Art

A CNN (Convolutional Neural Networks) is used for deep learning. In each layer of the CNN, a convolution operation and activation processing are often performed. If the result of the convolution operation is a negative value, the result of the activation processing will be zero, and thus a feature map obtained in each layer includes many zero values. US-2019-0114532 proposes a technique of, when performing a convolution operation of a filter with a size of n×n and a partial region with a size of n×n, skipping the processing to reduce power consumption if the ratio of the zero values in the partial region is high. US-2019-0147324 discloses a technique of omitting a product (multiply) operation if a data value or a weight coefficient of a filter is zero in a convolution operation. U.S. Pat. No. 9,818,059 also discloses a technique of omitting a product (multiply) operation in a convolution operation if pixel data of a feature image are zero.

SUMMARY

According to an embodiment of the disclosure, an apparatus for performing filter processing on a data array in a processing target block of a predetermined size includes a data memory, a coefficient memory, a controller, and a processor. The data memory is configured to hold the data array in the processing target block. The coefficient memory is configured to hold weight coefficients of a filter used for the filter processing. The controller is configured to determine, in a determination, whether data in a reference region in the processing target block, set in correspondence with the processing target block, are zero values. The processor is configured to generate a convolution operation result of the weight coefficients and data at a plurality of positions in the processing target block. The controller controls, based on a result of the determination, whether to perform at least some of multiply-accumulate operations of the data and the weight coefficients when the processor generates the convolution operation result.

According to another embodiment of the disclosure, a method of performing filter processing on a data array in a processing target block of a predetermined size includes: (1) determining, in a determination, whether data in a reference region in the processing target block, set in correspondence with the processing target block, are zero values; (2) controlling, based on a result of the determination, whether to perform at least some of multiply-accumulate operations of the data and weight coefficients of a filter used for the filter processing in generating a convolution operation result; and (3) generating a convolution operation result of the data and the weight coefficients at a plurality of positions in the processing target block in accordance with the control.

According to still another embodiment of the disclosure, a non-transitory computer-readable medium storing one or more programs which, when executed by a computer including one or more processors and one or more memories, cause the computer to (1) determine, in a determination, whether data in a reference region in the processing target block, set in correspondence with the processing target block, are zero values; (2) control, based on a result of the determination, whether to perform at least some of multiply-accumulate operations of the data and weight coefficients of a filter used for the filter processing in generating a convolution operation result; and (3) generate a convolution operation result of the data and the weight coefficients at a plurality of positions in the processing target block in accordance with the control.

Further features of the disclosure will become apparent from the following description of exemplary embodiments (with reference to the attached drawings).

BRIEF DESCRIPTION OF THE DRAWINGS

FIG. 2 is a view showing an example of the structure of a neural network according to the embodiment;

FIG. 4 is a block diagram showing an example of the arrangement of a convolutional neural network processing unit according to the embodiment;

FIGS. 6A to 6C are views showing an example of multiply-accumulate operation processing according to the embodiment;

FIGS. 7A to 7C are views showing an example multiply-accumulate operation processing according to the embodiment;

DESCRIPTION OF THE EMBODIMENTS

Figure 1A:
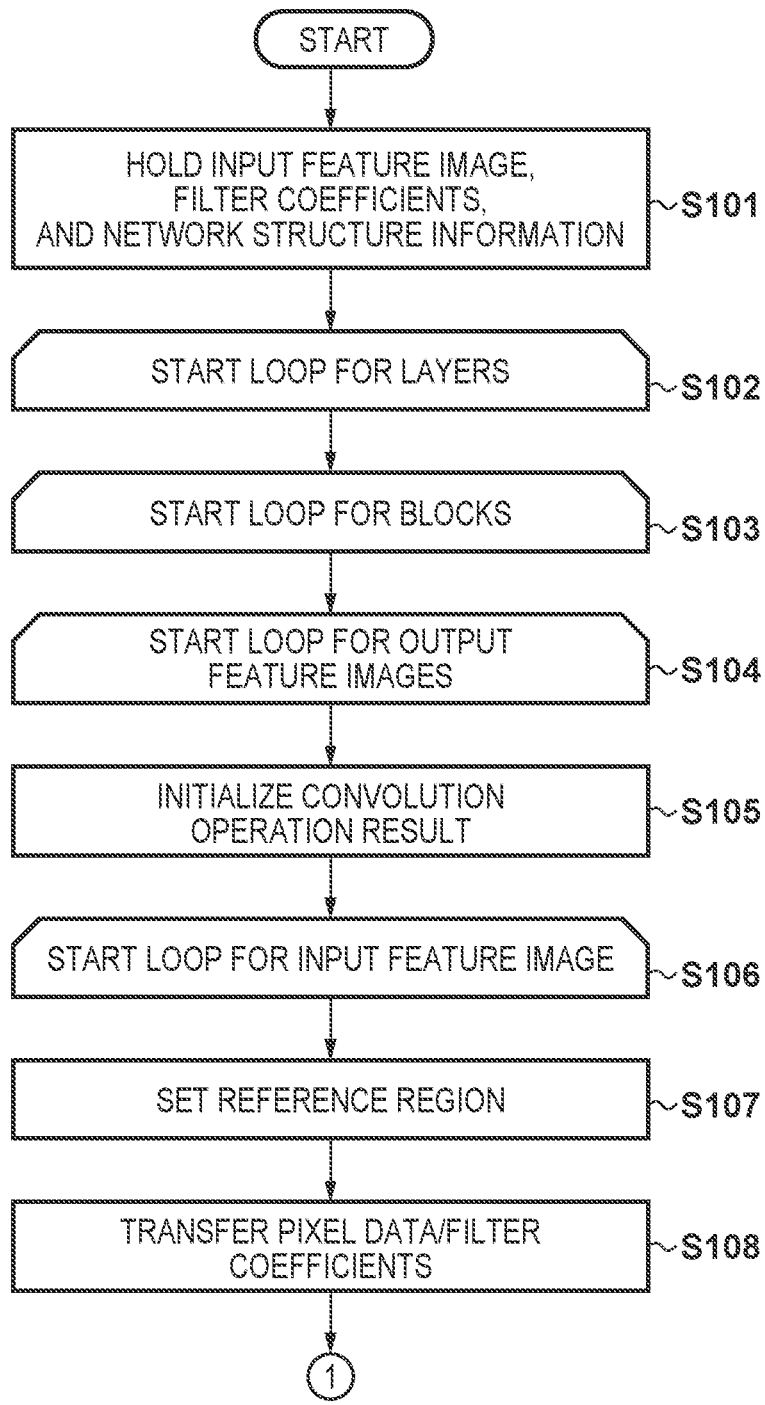
FIGS. 1A to 1B are flowcharts illustrating processing according to an embodiment.

Hereinafter, embodiments will be described in detail with reference to the attached drawings. Note, the following embodiments are not intended to limit the scope of the disclosure. Multiple features are described in the embodiments, but limitation is not made to the disclosure that requires all such features, and multiple such features may be combined as appropriate. Furthermore, in the attached drawings, the same reference numerals are given to the same or similar configurations, and redundant description thereof is omitted. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

In the method described in US-2019-0114532, determination of the ratio of zero values is repeated while sliding a partial region, and thus a processing load required for the determination processing may become large. Even in the methods described in US-2019-0147324 and U.S. Pat. No. 9,818,059, determination of a zero value is repeated for each pixel of a feature map, and thus a processing load required for the determination processing may become large.

According to an embodiment, it is possible to improve the efficiency of convolution operation processing on a data array including zero values, thereby reducing the power consumption or processing time required for the processing.

Figure 3:
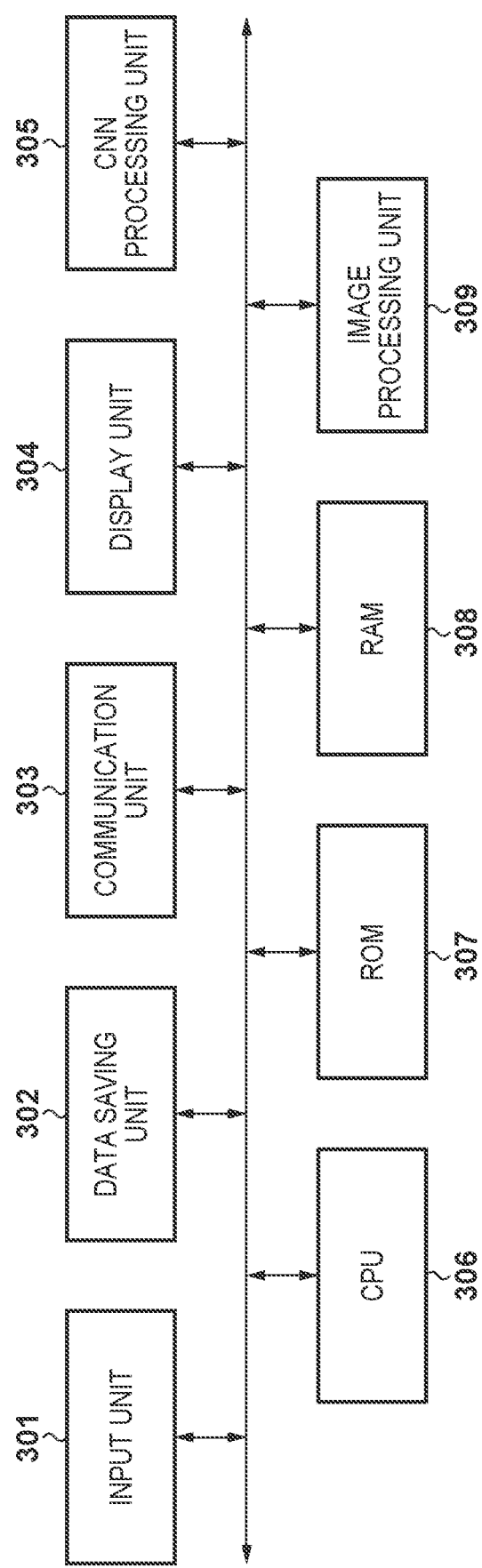
FIG. 3 is a block diagram showing an example of the arrangement of a processing apparatus according to the embodiment.

An operation apparatus according to the embodiment can perform filter processing on a data array in a processing target block of a predetermined size. FIG. 3 is a block diagram showing an example of the arrangement of a convolutional neural network processing apparatus as an operation apparatus according to the embodiment. For example, such processing apparatus can perform, for an image, processing using a neural network. Practical examples of processing that can be performed by such processing apparatus are processing of detecting an object in an image, processing of identifying an object in an image, and resolution increase processing on an image such as region division processing on an image. Such processing can be performed using, for example, a feature map obtained by inputting an image to a neural network.

An input unit or circuit 301 is a device that accepts an instruction or data from a user. The input unit 301 may be, for example, a keyboard, a pointing device, or a button.

A data storage unit or circuit 302 can store data such as image data. The data storage unit 302 may be, for example, a hard disk, a flexible disk, a CD-ROM, a CD-R, a DVD, a memory card, a CF card, a smart medium, an SD card, a memory stick, an xD picture card, or a USB memory. The data storage unit 302 may store a program or other data. Note that part of a RAM 308 (to be described later) may be used as the data storage unit 302.

A communication unit or circuit 303 is an interface (I/F) for performing communication between apparatuses. A processing apparatus 300 can exchange data with another apparatus via the communication unit 303. Note that the processing apparatus 300 may use, as a virtual data storage unit, that is, as the data storage unit 302, a storage device connected via the communication unit 303.

A display unit or circuit 304 is a device that displays information to the user or the like. The display unit 304 can display, for example, an image before or after image processing, or another image such as a GUI. The display unit 304 may be, for example, a CRT or a liquid crystal display. The display unit 304 may be a device connected by a cable or the like outside the processing apparatus 300. Note that the input unit 301 and the display unit 304 may be implemented by the same device, and may be, for example, a touch screen device. In this case, input on the touch screen corresponds to input to the input unit 301.

A convolutional neural network (CNN) processing unit or circuit 305 can perform processing (steps S101 to S117) using a neural network for an image in accordance with a flowchart shown in FIGS. 1A-1B to be described later. The processing performed by the CNN processing unit 305 includes filter processing using a convolution operation. The CNN processing unit 305 may perform processing using the neural network for the result of image processing stored in the RAM 308 by an image processing unit 309. The CNN processing unit 305 can output a processing result to the data storage unit 302 (or the RAM 308). This processing result can be used for various processes such as image processing or image recognition processing by a CPU 306. The CNN processing unit 305 may be used for a purpose other than the image processing. That is, the components shown in FIG. 3 other than the CNN processing unit 305 are not essential for the disclosure. Note that the CNN processing unit 305 can perform the filter processing on a still image or a moving image. The CNN processing unit 305 can perform, for example, the filter processing on each of a plurality of frames included in the moving image. In this case, the CPU 306 can perform image processing or image recognition processing on the moving image.

The CPU 306 controls the overall operation of the processing apparatus 300. The CPU 306 can also perform various processes such as image processing or image recognition processing based on the processing result generated by the CNN processing unit 305 and stored in the data storage unit 302 or the RAM 308. The CPU 306 can store a processing result in the RAM 308.

A ROM 307 and the RAM 308 provide, to the CPU 306, a program, data, and a work area necessary for processing by the CPU 306. The program necessary for the processing by the CPU 306 may be stored in the data storage unit 302 or the ROM 307, and loaded from the data storage unit 302 or the ROM 307 into the RAM 308. Alternatively, the processing apparatus 300 may receive the program via the communication unit 303. In this case, the program may be temporarily stored in the data storage unit 302 and then loaded into the RAM 308, or may be loaded from the communication unit 303 into the RAM 308 directly. In either case, the CPU 306 can execute the program loaded into the RAM 308.

The image processing unit or circuit 309 can perform image processing on image data. For example, in accordance with an instruction from the CPU 306, the image processing unit 309 can read out image data written in the data storage unit 302, perform range adjustment of pixel values, and then write a processing result in the RAM 308.

The processing apparatus 300 shown in FIG. 3 includes the above-described units. The above-described units are interconnected to transmit/receive data. However, for example, the respective units including the input unit 301, the data storage unit 302, and the display unit 304 may be interconnected by a communication path complying with a known communication method. That is, a data processing apparatus according to the embodiment may be formed by a plurality of physically separated apparatuses.

The processing apparatus 300 shown in FIG. 3 includes the one CPU 306 but may include a plurality of CPUs. Furthermore, at least some of the functions of the respective units or circuits (for example, the CNN processing unit 305 and the image processing unit 309) of the processing apparatus 300 may be implemented when the CPU 306 operates according to the program.

The processing apparatus 300 may include various components not shown in FIG. 3 but a description thereof will be omitted.

Example of Structure of Neural Network

As described above, the CNN processing unit 305 can perform, for a data array, filter processing using a filter. Furthermore, the CNN processing unit 305 can perform processing according to the neural network including a plurality of layers, and can perform such filter processing in at least one layer. The filter processing includes a convolution operation, and the convolution operation includes a plurality of multiply-accumulate operations. Note that one multiply-accumulate operation indicates a set of a product (multiply) operation of one data and one filter coefficient and an operation of accumulating the product. The multiply operation may be replaced by an add operation when either of the data or the filter coefficient is 1 or −1. One convolution operation indicates an operation of obtaining one output data by convolving a filter to a specific data array (for example, a local region of a feature image), and includes a plurality of multiply-accumulate operations. A case in which the filter processing is performed for the feature image will be described below. The feature image includes, as a data array, pixel data for the respective pixels.

An example of the neural network used by the CNN processing unit 305 will be described below. The CNN as a type of neural network has a structure in which a plurality of layers are hierarchically connected. Each layer may include a plurality of feature images. A feature image obtained by performing corresponding processing on a feature image of a preceding layer will be referred to as a feature image of a next layer hereinafter. Note that a case in which the feature image is a two-dimensional feature image will be described below. However, the feature image may be a one-dimensional feature image or a high-dimensional feature image of three or more dimensions.

For example, the feature image of the next layer may be calculated using the filter processing on the feature image of the preceding layer. In this filter processing, a filter formed by filter coefficients corresponding to the preceding layer can be used. Each of a plurality of feature images of the next layer can be generated by the filter processing using the corresponding filter. Furthermore, to calculate one feature image of the next layer, a plurality of feature images of the preceding layer may be used. For example, the filter processing using the corresponding filter can be performed for each of the plurality of feature images of the preceding layer, and one feature image of the next layer can be obtained based on a plurality of obtained processing results.

For example, a feature image $(O_{i,j}(n))$ after the filter processing can be calculated using feature images $(I_{i,j}(m))$ of the preceding layer and filter coefficients $(W_{0,0}(m, n)$ to $W_{X-1,Y-1}(m, n))$ in accordance with equation (1) below, where i and j represent the coordinates of the feature image, x and y represent the coordinates of the filter, n represents the number of the feature image of the next layer, and m represents the number of the feature image of the preceding layer. The number of feature images of the preceding layer is IC. The filter coefficients are different for each feature image of the preceding layer and each feature image of the next layer, and there are X×Y coefficients for each combination of feature images.

$$O_{i,j}(n) = \sum_{m=1}^{IC} \sum_{x=0}^{X-1} \sum_{y=0}^{Y-1} (I_{i+x,j+y}(m) \times W_{x,y}(m, n)) \quad (1)$$

As described above, the number of multiply-accumulate operations performed in the convolution operation for calculating one pixel data of one feature image of the next layer is M×X×Y In this way, the filter includes the plurality of filter coefficients, and the pixel value of each pixel of the feature image after the filter processing is obtained by the convolution operation of the pixel values of a pixel group surrounding the corresponding pixel of the feature image of the preceding layer and the filter coefficients of the filter.

By further performing processing such as activation processing or pooling processing on the feature image $O_{i,j}(n)$ obtained by the filter processing, the feature image of the next layer can be calculated. The activation processing can be performed in accordance with equation (2) below. In equation (2), f(·) represents an ReLu (Rectified Linear Unit) function, and a variable x represents input data.

$$f(x) = \begin{cases} 0, & x < 0 \\ x, & x \geq 0 \end{cases} \quad (2)$$

If the activation processing according to equation (2) is performed, when the result of the convolution operation is a negative value, the result of the activation processing is zero. In this case, pixel data at a corresponding position of the feature image of the preceding layer is zero, and a zero value is input to the multiply-accumulate operation in the next layer. If the pixel data of the feature image is zero, this data does not contribute to the result of the convolution operation. Therefore, even if the multiply-accumulate operation using this data is omitted, the result is not influenced.

FIG. 2 shows a practical example of the structure of the neural network. In the neural network shown in FIG. 2, the number of layers is 4, and each layer includes four feature images. Each feature image of each layer is obtained based on a filter processing result obtained by applying, to the pixel data of the feature image, a filter defined for each feature image. The filter coefficients of the filter are obtained in advance in accordance with a known training technique. Furthermore, the filter processing of applying the filter includes a convolution operation, that is, a plurality of multiplication and accumulation operations. Referring to FIG. 2, an arrow indicates a convolution operation.

Figures 11A, 11B, 12:
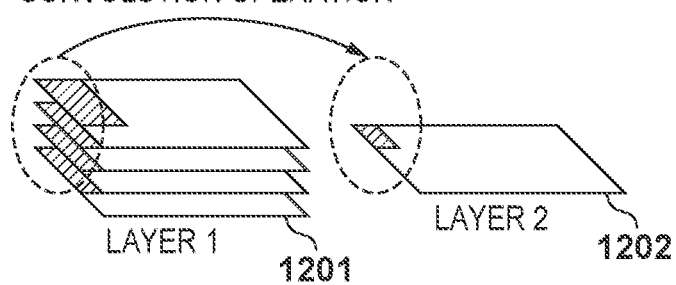
FIGS. 11A and 11B are views each showing an example of a reference region.
FIG. 12 is a view showing the relationship between the neural network and a convolution operation.

In layer 1, a plurality of feature images 202 of layer 2 are generated by the filter processing using a plurality of feature images 201 and the filter coefficients based on equations (1) and (2). In layer 2, a plurality of feature images 203 of layer 3 are similarly generated by the filter processing using the plurality of feature images 202 and the filter coefficients. In layer 3, a plurality of feature images 204 of layer 4 are similarly generated by the filter processing using the plurality of feature images 203 and the filter coefficients. In this way, the filter processing on each layer is performed in the order of the layers. As shown in FIG. 12, a plurality of pixel data are extracted from identical positions of four feature images 1201 in layer 1, and undergo the filter processing and activation processing. As a processing result, the pixel data of part of a feature image 1202 of layer 2 are obtained.

FIG. 2 further shows the type of filter processing and a filter size in each layer. In layers 1, 2, and 3, the filter processes are performed using a filter with a size of 3×3, a filter with a size of 5×5, and a filter with a size of 7×7, respectively. As described above, the size of the filter used for the filter processing may be different for each layer.

Network structure information representing the structure of the convolutional neural network may be stored in the RAM 308. The network structure information may include, for example, the number of layers, the number of feature images of each layer, the type of filter processing performed in each layer, and the types of activation processing and pooling processing performed in each layer.

FIG. 4 shows an example of the functional arrangement of the CNN processing unit 305. In this embodiment, the CNN processing unit 305 can perform the filter processing on the data array in the processing target block of the predetermined size. The CNN processing unit 305 includes a coefficient memory 403, a feature data memory 405, a data selection unit or circuit 408, a zero determination unit or circuit 409, and a convolution processing unit or circuit 407. As will be described later, the CNN processing unit 305 may include a controller 401, a data memory 402, a readout unit or circuit 404, a reference region setting unit 406, an activation processing unit 410, and a result memory 411.

The data memory 402 holds some data of the data storage unit 302. The coefficient memory 403 holds the weight coefficients (filter coefficients) of the filter used for the filter processing. For example, the coefficient memory 403 can hold the filter coefficients $W_{x,y}(m, n)$ acquired from the data memory 402. The feature data memory 405 holds the data array in the processing target block. For example, the feature data memory 405 can hold the pixel data of part of a feature image I(m). The filter coefficients are some of the weight coefficients of the convolutional neural network.

The reference region setting unit 406 sets a reference region corresponding to the processing target block. The reference region may be determined in advance in accordance with the size of the processing target block and the size of the filter. The reference region setting unit 406 can set one or more reference regions, and at least one reference region is smaller than the processing target block, as indicated by a reference region 504 or 505 shown in FIG. 5B or 5C. The reference region will be described in detail later.

The convolution processing unit 407 generates the result of a convolution operation of the weight coefficients (filter coefficients) of the filter and data at a plurality of positions in the processing target block. In this embodiment, the convolution processing unit 407 can perform a convolution operation of convolving the filter to the processing target block in the input feature image, thereby generating a filter processing result for the input feature image. For example, the convolution processing unit 407 can obtain the convolution operation result using the filter coefficients and the pixel data in accordance with equation (1). In this embodiment, the convolution processing unit 407 calculates the convolution operation result using the pixel data held in the feature data memory 405 and the filter coefficients held in the coefficient memory 403 in accordance with a control signal from the controller 401.

The convolution processing unit 407 includes a plurality of convolution processing units 412. Each convolution processing unit 412 can perform a multiply-accumulate operation of accumulating the product of the pixel data and the filter coefficient. Furthermore, the plurality of convolution processing units 412 can perform multiply-accumulate operations in parallel with respect to a plurality of positions in the processing target block. Each convolution processing unit 412 includes an arithmetic core or circuit 418, a feature data storage unit or circuit 413, a coefficient storage unit or circuit 414, and a result storage unit or circuit 417. A multiplier 415 and an adder 416 used for the multiply-accumulate operation are included in the arithmetic core 418. In the embodiment, one convolution processing unit 412 may be used to sequentially perform a multiply-accumulate operation for each of the plurality of positions in the processing target block. The processing by the convolution processing unit 407 will be described in detail later.

The data selection unit 408 transfers, to the convolution processing unit 407, the pixel data used for the processing by the convolution processing unit 407. In accordance with a determination result by the zero determination unit 409, the data selection unit 408 controls whether to perform at least some of the multiply-accumulate operations at the plurality of positions in the processing target block. The zero determination unit 409 determines whether data in the reference region in the processing target block, set by the reference region setting unit 406 in correspondence with the processing target block, are zero values. Under the control of the data selection unit 408 and the zero determination unit 409, the convolution processing unit 407 can omit some of the multiply-accumulate operations for generating a filter processing result for the processing target block. In other words, the convolution processing unit 407 can generate a filter processing result for the processing target block by partially performing the convolution operation. In this embodiment, if the data selection unit 408 determines that the data in the reference region are zero values, the convolution processing unit 407 can omit at least some of the multiply-accumulate operations of the data at each of the plurality of positions in the processing target block and the weight coefficients. The processing by the data selection unit 408 and the zero determination unit 409 will be described in detail later.

Note that the zero value in this specification is exactly zero in the following embodiment. However, the zero value may be a value whose absolute value is equal to or smaller than a predetermined value (for example, 1) that hardly influences the convolution operation result. Furthermore, data in the reference region being zero values stands for the data in the reference region being all zero in the following embodiment. On the other hand, the data in the reference region being zero values may mean that the ratio of zeros is equal to or higher than a predetermined ratio (for example, 85%), thereby hardly influencing the convolution operation result, as in US-2019-0114532.

The activation processing unit 410 further performs activation processing on the filter processing result. The activation processing unit 410 can calculate the result of the activation processing in accordance with, for example, equation (2). The type of activation processing is not particularly limited, and the activation processing unit 410 may perform activation processing using another nonlinear function or quantization function. Furthermore, the activation processing unit 410 may adjust the size of an output feature image by performing pooling processing based on the result of the activation processing in accordance with the network structure information. In some cases, both or one of the activation processing and the pooling processing may be omitted.

The result memory 411 holds the processing result obtained by the activation processing unit 410. The readout unit 404 transfers, to the zero determination unit 409 and the convolution processing unit 407, addresses for accessing the feature data memory 405 and the coefficient memory 403. The zero determination unit 409 and the convolution processing unit 407 can read out the pixel data from the feature data memory 405 and the filter coefficients from the coefficient memory 403 in accordance with the addresses.

Note that these processes need not be performed by dedicated processors. For example, the CPU 306 may perform the activation processing and the pooling processing. The CPU 306 may perform one or more of the processes by the reference region setting unit 406, the data selection unit 408, and the zero determination unit 409.

Figure 1B:
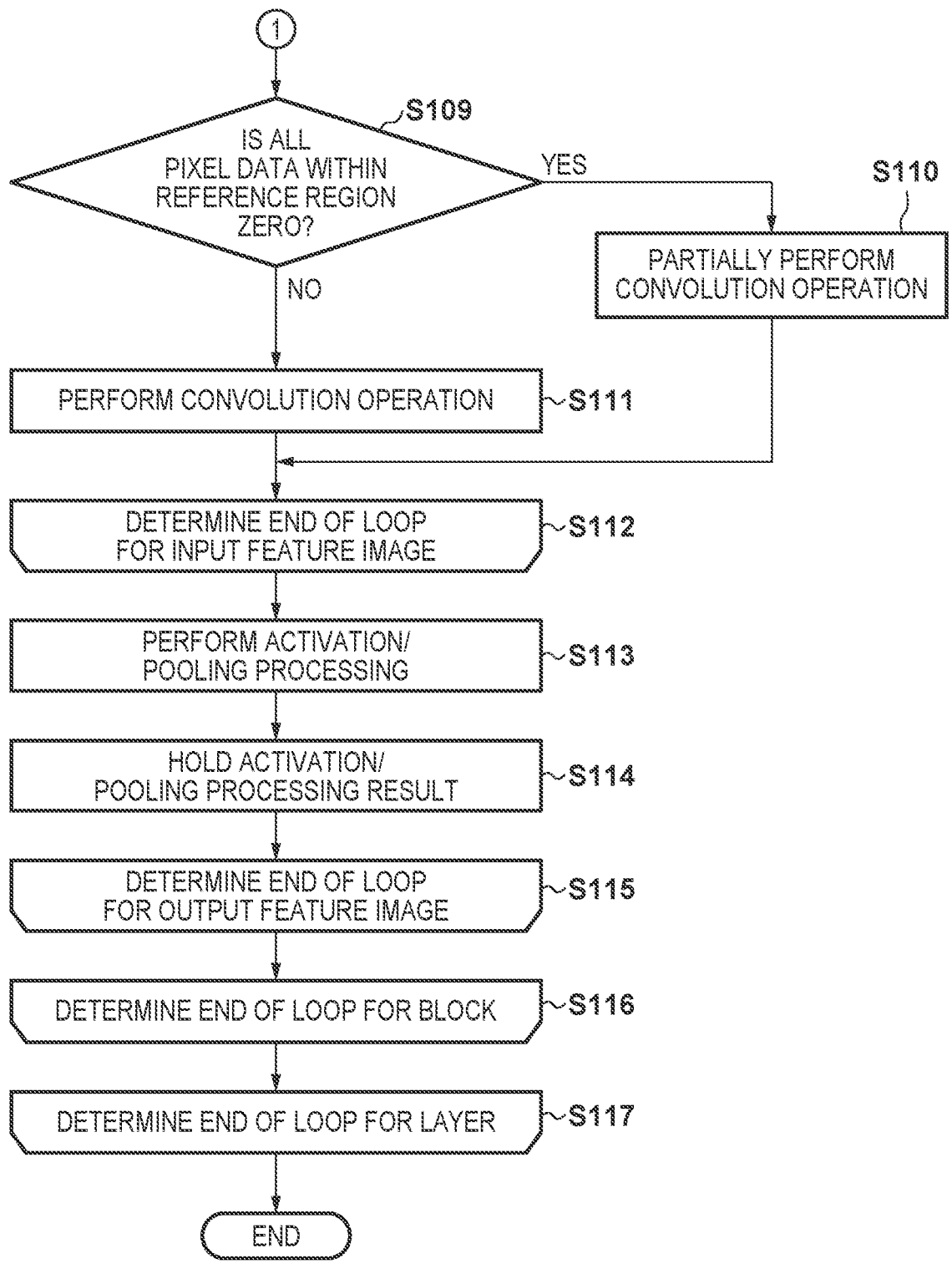

FIGS. 1A-1B show an example of the flowchart of an information processing method performed by the CNN processing unit 305. The controller 401 (for example, the CPU or sequencer of the controller 401) can perform control processing shown in steps S101 to S117. Each step of the processing using the convolutional neural network according to this embodiment will be described below with reference to FIGS. 1A-1B.

In step S101, the controller 401 reads out an input feature image, the filter coefficients used for the filter processing, the network structure information from the RAM 308, and holds them in the data memory 402. In the example shown in FIG. 2, the input feature image may be an image with RGB+D (depth) planes or a feature image obtained by performing the filter processing on images.

In step S102, a loop for each layer starts. In step S102, the controller 401 can select the first layer. In the following description, the layer selected in step S102 will be referred to as the preceding layer and the next layer of the preceding layer will be referred to as the next layer. By sequentially performing processes in steps S103 to S116 for each layer, it is possible to obtain the result of the processing using the convolutional neural network.

In step S103, a loop for each block starts. In this embodiment, each output feature image of the next layer is divided into a plurality of feature image blocks. The pixel data of each feature image block of one output feature image are calculated using the pixel data of the corresponding feature image block of the input feature image of the preceding layer. For example, in an example of FIG. 5A, the pixel data of a feature image block 512 of an output feature image 502 are obtained by the filter processing on the feature image block 503 of each of a plurality of input feature images 501. In this example, the feature image blocks of the output feature image are adjacent to each other without overlapping each other but the feature image blocks of the input feature image are arranged to overlap each other. Each feature image block corresponds to a processing target block.

In step S103, one feature image block (for example, the feature image block 512) of the output feature image is selected. Furthermore, the corresponding feature image block (for example, the feature image block 503) of the input feature image used to calculate pixel data in the feature image block of the output feature image is also selected. In steps S104 to S115, one feature image block common to the plurality of output feature images is selected, and the pixel data of each output feature image in the selected feature image block are calculated. At this time, the pixel data of each input feature image in the selected feature image block are referred to. By sequentially performing the processes in steps S104 to S115 for each feature image block, it is possible to obtain each output feature image of the next layer.

In step S104, a loop for each output feature image of the next layer starts. In steps S105 to S114, the pixel data of one output feature image in the feature image block selected in step S103 are calculated. In this way, the pixel data are sequentially calculated for each of the plurality of output feature images of the next layer.

In step S105, the controller 401 initializes the convolution operation result held in the result storage unit 417 of the convolution processing unit 407. For example, the controller 401 can set the convolution operation result to zero.

In step S106, a loop for each input feature image of the preceding layer starts. In steps S107 to S111, the filter processing is performed for the feature image block selected in step S103 of one input feature image. By sequentially performing the processes in steps S107 to S111, the filter processing is performed for each input feature image. The loop of steps S107 to S111 can be performed for each input feature image to which reference is made to obtain the output feature image selected in step S104.

In step S107, the reference region setting unit 406 sets a reference region for zero value pixel data. A method of setting a reference region by the reference region setting unit 406 will be described later.

In step S108, the controller 401 reads out part of the input feature image from the data memory 402, and transfers it to the feature data memory 405. The controller 401 can transfer, to the feature data memory 405, the pixel data in the feature image block selected in step S103 of the input feature image selected in step S106. Furthermore, the controller 401 reads out some of the filter coefficients from the data memory 402, and transfers them to the coefficient memory 403. To obtain the output feature image selected in step S104, the controller 401 can transfer, to the coefficient memory 403, the filter coefficients for the filter processing performed for the input feature image selected in step S106. As described above, in step S108, the controller 401 can read out, from the data memory 402, the pixel data and the filter coefficients to which reference is made when performing the convolution operation in steps S109 to S111.

In step S109, the zero determination unit 409 determines whether all the pixel data in the reference region of the input feature image are zero. If all the pixel data in the reference region are zero, the process advances to step S110; otherwise, the process advances to step S111.

In step S110, the convolution processing unit 407 generates a convolution operation result for the feature image block selected in step S103 of the input feature image selected in step S106. This convolution operation result is formed by the results of multiply-accumulate operations of the pixel data and the filter coefficients for the plurality of positions in the feature image block. In step S110, the convolution processing unit 407 acquires the convolution operation result with respect to a position in the feature image block by the first processing. More specifically, in step S110, the convolution processing unit 407 can omit some of the multiply-accumulate operations of the pixel data and the filter coefficients for the plurality of positions in the feature image block. The detailed processing in step S110 will be described later.

In step S111, the convolution processing unit 407 generates the convolution operation result for the feature image block selected in step S103 of the input feature image selected in step S106. In step S111, the convolution processing unit 407 acquires the convolution operation result by the second processing different from step S110. For example, the convolution processing unit 407 can perform the multiply-accumulate operations of the pixel data and the filter coefficients without omitting them for the plurality of positions in the feature image block.

In step S112, the controller 401 determines whether the loop for each input feature image ends. If the processing ends for all the input feature images, the process advances to step S113; otherwise, the process returns to step S107 and the processing on the next input feature image starts.

When advancing from step S112 to step S113, the filter processing result for the input feature image selected in step S106 is accumulated in the result storage unit 417 for each pixel. For example, the pixel data $O_{i,j}(n)$ according to equation (1) for each pixel of the feature image block selected in step S103 of the output feature image selected in step S104 may be stored in the result storage unit 417.

In step S113, in accordance with a control signal from the controller 401, the activation processing unit 410 performs activation processing based on the filter processing results held in the result storage unit 417.

In step S114, the controller 401 stores the processing result by the activation processing unit 410 in the data memory 402. The processing result stored in the data memory 402 corresponds to the pixel data of the feature image block selected in step S103 of the output feature image selected in step S104. The thus stored pixel data of the output feature image are used as the pixel data of the input feature image when performing the processing of the next layer.

In step S115, the controller 401 determines whether the loop for each output feature image ends. If the processing ends for all the output feature images, the process advances to step S116; otherwise, the process returns to step S105, and the processing on the next output feature image starts.

In step S116, the controller 401 determines whether the loop for each feature image block ends. If the processing ends for all the feature image blocks, the process advances to step S117; otherwise, the process returns to step S104, and the processing on the next feature image block starts.

In step S117, the controller 401 determines whether the loop for each layer ends. If the processing ends for all the layers, the processing shown in FIGS. 1A-1B ends; otherwise, the process returns to step S103 and the processing for the next layer starts.

Example of Processing in This Embodiment

According to this embodiment, it is possible to reduce the calculation cost in the filter processing, and thus improve the processing efficiency of the filter processing. Improvement of the processing efficiency according to this embodiment will be described with reference to FIGS. 5A to 7C. The processing apparatus according to this embodiment can process the plurality of pixel data included in the plurality of feature images in parallel. A case in which the processing using the convolutional neural network of the four layers shown in FIG. 2 is performed will be described below. Referring to FIG. 2, a solid-line block represents a processing target, and a solid-line arrow represents a convolution operation associated with the processing target.

Figure 5A:
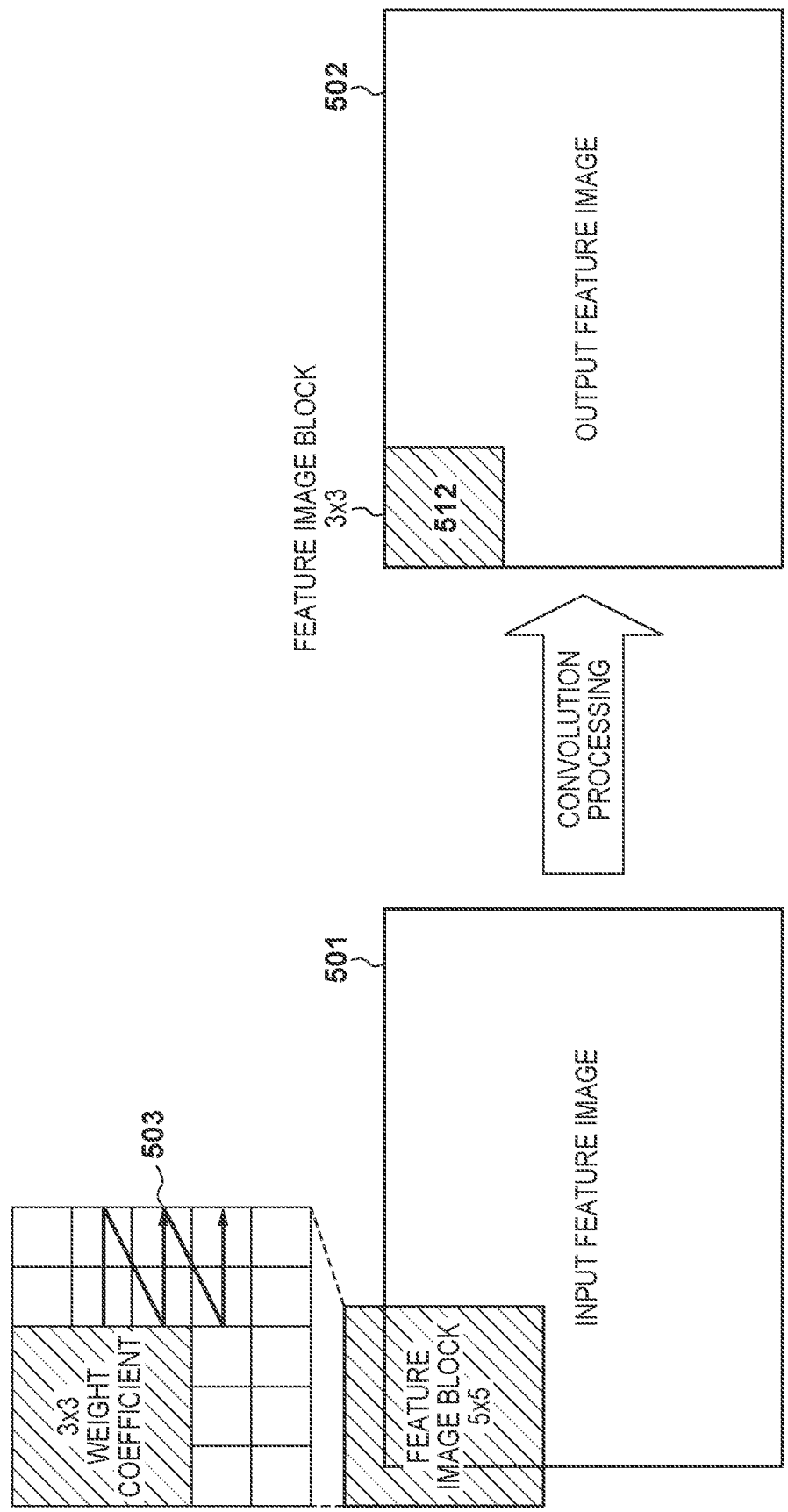
FIGS. 5A to 5C are views respectively showing examples of convolution processing and a reference region.
Figure 5B:
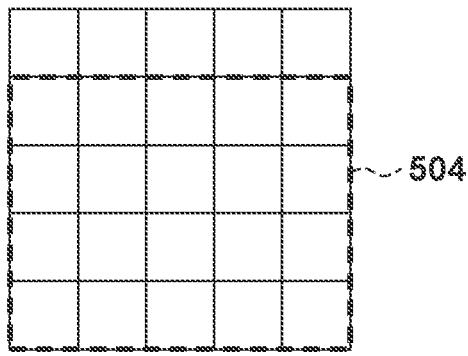
Figure 5C:
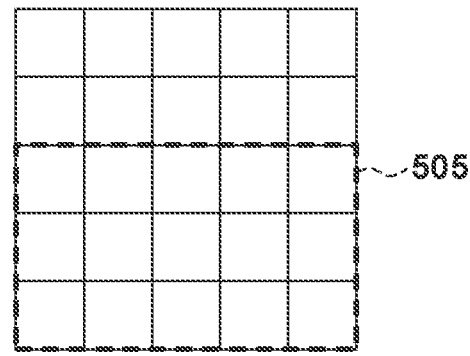

FIG. 5A shows an example of processing of generating feature images (output feature images) of layer 2 by performing the filter processing on the feature images (input feature images) of layer 1. In this filter processing, a filter with a size of 3×3 is used, and thus a kernel size is 3×3. The input feature image 501 is divided into the plurality of feature image blocks 503, and these blocks are sequentially processed. Each feature image block 503 of the input feature image 501 includes 5×5 pixel data. By performing the filter processing (and further processing such as activation processing) using the feature image block 503, the feature image block 512 of the output feature image 502 is obtained. The feature image block 512 includes 3×3 pixel data. FIGS. 5B and 5C show, as examples of the reference region for zero value, the reference region 504 as a 5×4 region surrounded by dotted lines and the reference region 505 as a 5×3 region surrounded by dotted lines.

In an example of processing shown in FIGS. 6A to 6C, a block 601 is a feature image block of an input feature image, and includes 25 pixel data with a size of 5×5. Each pixel is assigned with a different number of 1 to 25. In the example of the processing of performing the filter processing by sliding one pixel in each of vertical and horizontal directions using a 3×3 filter with respect to the block 601, nine 3×3 kernels 602 to 610 (kernels 1 to 9) are used. Each of the kernels 602 to 610 overlaps the adjacent kernel, and shares some pixel data. In FIGS. 6A and 6C, a white pixel indicates that the pixel data has a zero value, and a hatched pixel indicates that the pixel data does not have a zero value.

In this embodiment, the nine kernels 602 to 610 are processed in parallel by the nine convolution processing units 412. The pixel data in each of the kernels 602 to 610 are sequentially processed. The same filter is applied to the kernels 602 to 610. Therefore, the convolution processing units 412 can perform multiply-accumulate operations of the input data (for example, the pixel data at upper left positions of the kernels 602 to 610) and the common weight coefficient (for example, the weight coefficient at the upper left position of the filter) in parallel.

As in the example shown in FIGS. 6A and 6C, if all the pixel data in the reference region 504 have zero values, the pixel data in the lower two lines of each of the kernels 602 to 604 and the three lines of each of the kernels 605 to 610 all have zero values. In other words, with respect to the kernels 602 to 610, non-zero values are included only in the uppermost line. With respect to the kernels 602 to 610, the lower two lines have zero values, and the multiply-accumulate operations using these pixel data do not influence the filter processing result. Therefore, in this embodiment, each of the nine convolution processing units 412 processes only the pixel data of the uppermost line of the corresponding kernel, as indicated by an arrow 611 in FIG. 6B. For example, instead of multiplying each of pixels 1 to 9 by the corresponding filter coefficient and accumulating the obtained product, each convolution processing unit 412 multiplies only each of pixels 1 to 3 by the corresponding filter coefficient and accumulates the obtained product. As described above, each convolution processing unit 412 can acquire the convolution operation result by the common first processing on all the plurality of pixels in the processing target block. With this arrangement, each convolution processing unit 412 can perform three multiply-accumulate operations while omitting six multiply-accumulate operations.

Note that in this embodiment, the processing using the pixel data of the uppermost line is also performed for the kernels 605 to 610 but the operation results are zero, and thus do not influence the filter processing result. The processing using the pixel data of the uppermost line for the kernels 605 to 610 may be omitted. In this case, among the nine convolution processing units 412, the convolution processing units 412 that process the kernels 605 to 610 can be controlled not to perform the operation for the block 601.

The processing in step S110 can be performed, as described above. That is, since it is determined in step S109 that all the pixel data in the reference region are zero, the convolution operation is partially performed. That is, each of the convolution processing units 412 that operates in parallel performs multiply-accumulate operations of three pixel data of each kernel and three filter coefficients, and performs no multiply-accumulate operations of the remaining six pixel data of each kernel and six filter coefficients. As described above, since the remaining six pixel data of each kernel are zero, the filter processing results are not influenced even if the operations using these pixel data are not performed. In step S110, the convolution operation result is acquired by the multiply-accumulate operations the number (three in this example) of which is smaller than the number (nine in this example) of filter coefficients. Furthermore, each convolution processing unit 412 sequentially performs the multiply-accumulate operation of the data and the filter coefficient using not all but some of the plurality of filter coefficients. Each convolution processing unit 412 sequentially performs the multiply-accumulate operation of the data and the weight coefficient using each of the plurality of weight coefficients.

At this time, the coefficient data used for the multiply-accumulate operation is supplied from the coefficient memory 403 to the convolution processing unit 407. The pixel data used for the multiply-accumulate operation is supplied from the zero determination unit 409 to the convolution processing unit 407 via the data selection unit 408. The data selection unit 408 can control supply of the pixel data from the coefficient memory 403 to the convolution processing unit 407 in accordance with the determination result by the zero determination unit 409. That is, the data selection unit 408 performs the multiply-accumulate operation using specific pixel data, and can control the convolution processing unit 407 to omit the multiply-accumulate operation using the specific pixel data. For example, the data selection unit 408 may control the multiply-accumulate operation by the convolution processing unit 407 by supplying, to the convolution processing unit 407, only the pixel data used for the multiply-accumulate operation. Furthermore, transfer of the filter coefficient may be controlled so that only the filter coefficient used for the multiply-accumulate operation is transferred from the coefficient memory 403 to the convolution processing unit 407 in accordance with the determination result by the zero determination unit 409.

In addition, as indicated by the reference region 505 shown in FIG. 5C, the reference region may have a size of 5×3. If all the pixel data in the reference region 505 have zero values, the pixel data in the lowest line of each of the kernels 602 to 604, the lower two lines of each of the kernels 605 to 607, and the three lines of each of the kernels 608 to 610 all have zero values. Therefore, in this embodiment, each of the nine convolution processing units 412 can process only the pixel data of the upper two lines of the corresponding kernel. Note that in this embodiment, processing using the pixel data in the central line is performed with respect to each of the kernels 605 to 607, and processing using the pixel data in the upper two lines is performed with respect to each of the kernels 608 to 610. However, since the operation results obtained by using these pixel data are zero, the processing results do not influence the filter processing result.

As described above, reference regions of various sizes can be set. On the other hand, it can be understood from the above description that as the reference region is larger, the effect of reducing the calculation cost is larger.

On the other hand, as in an example shown in FIG. 7A, if it is not determined that all the pixel data in the reference region 504 have zero values, each of the nine convolution processing units 412 processes the pixel data of the all lines of the corresponding kernel, as indicated by arrows 711 in FIG. 7B. That is, with respect to kernels 702 to 710 shown in FIG. 7C, operation using all the pixel data is performed. The processing in step S111 can be performed in this way. That is, for all the plurality of positions in the feature image block, the convolution processing units 412 can acquire the convolution operation result by the common second processing different from the first processing that omits some multiply-accumulate operations. In the first processing in step S110 and the second processing in step S111, the convolution operation results are respectively acquired by the multiply-accumulate operations the numbers of which are different from each other. In step S111, the convolution operation result is acquired by the multiply-accumulate operations the number (nine in this example) of which is equal to the number (nine in this example) of filter coefficients.

As described above, according to this embodiment, it is determined whether all the data in the reference region have zero values, and some of the multiply-accumulate operations for obtaining the convolution operation result are omitted in accordance with the determination result. Therefore, it is possible to improve the efficiency of the convolution operation processing while reducing the calculation cost, thereby reducing the power consumption and processing time required for the processing. In this embodiment, it is determined whether the data are zero values with respect to the reference region larger than the filter size. In other words, each of the plurality of convolution operations can be controlled based on the determination result for the reference region. Therefore, it is easy to reduce the calculation cost.

In particular, in this embodiment, the reference region having a size different from the block size of the input feature image is used. Thus, even if not all the pixel data in the block are zero, it is possible to reduce the calculation cost. With the arrangement according to this embodiment, even if not all the data in the kernel have zero values, some of the multiply-accumulate operations are omitted, as indicated by the arrow 611, thereby making it possible to increase the speed of the processing while reducing the calculation cost. This arrangement is particularly effective if the plurality of convolution processing units perform the processes in parallel with respect to the different kernels, as shown in FIG. 4. That is, if each convolution processing unit determines to omit multiplication of the pixel data having zero values or to omit the convolution operation for the kernel including many zero values, the processing time of each convolution processing unit changes. Therefore, in order for the plurality of convolution processing units to operate in synchronism with each other, a further circuit may be required. On the other hand, with the arrangement according to this embodiment, it is possible to reduce the calculation cost while operating the plurality of convolution processing units in synchronism with each other, as described with reference to FIGS. 6A to 6C.

With the arrangement in which it is determined whether all the data in the reference region have zero values and some of the multiply-accumulate operations for obtaining the convolution operation result are omitted in accordance with the determination result, it is possible to maintain the accuracy of the filter processing.

Modification

In the above-described embodiment, it is determined whether the pixel data in one reference region are zero values. However, two or more reference regions may be used. For example, the zero determination unit 409 may determine, for each of a plurality of reference regions, whether data in the reference region are zero values. Then, if the zero determination unit 409 determines that the data in a specific reference region are zero values, the convolution processing unit 407 can acquire a convolution operation result by multiply-accumulate operations the number of which corresponds to the specific reference region with respect to the positions in the feature image block.

In the above-described embodiment, if the pixel data in the reference region are zero values, when obtaining the convolution operation result for the feature image block of the input feature image, the convolution operation is partially performed. On the other hand, when obtaining the convolution operation result for the feature image block of the input feature image, the convolution operation may be omitted. This case will be described below.

Figure 10:
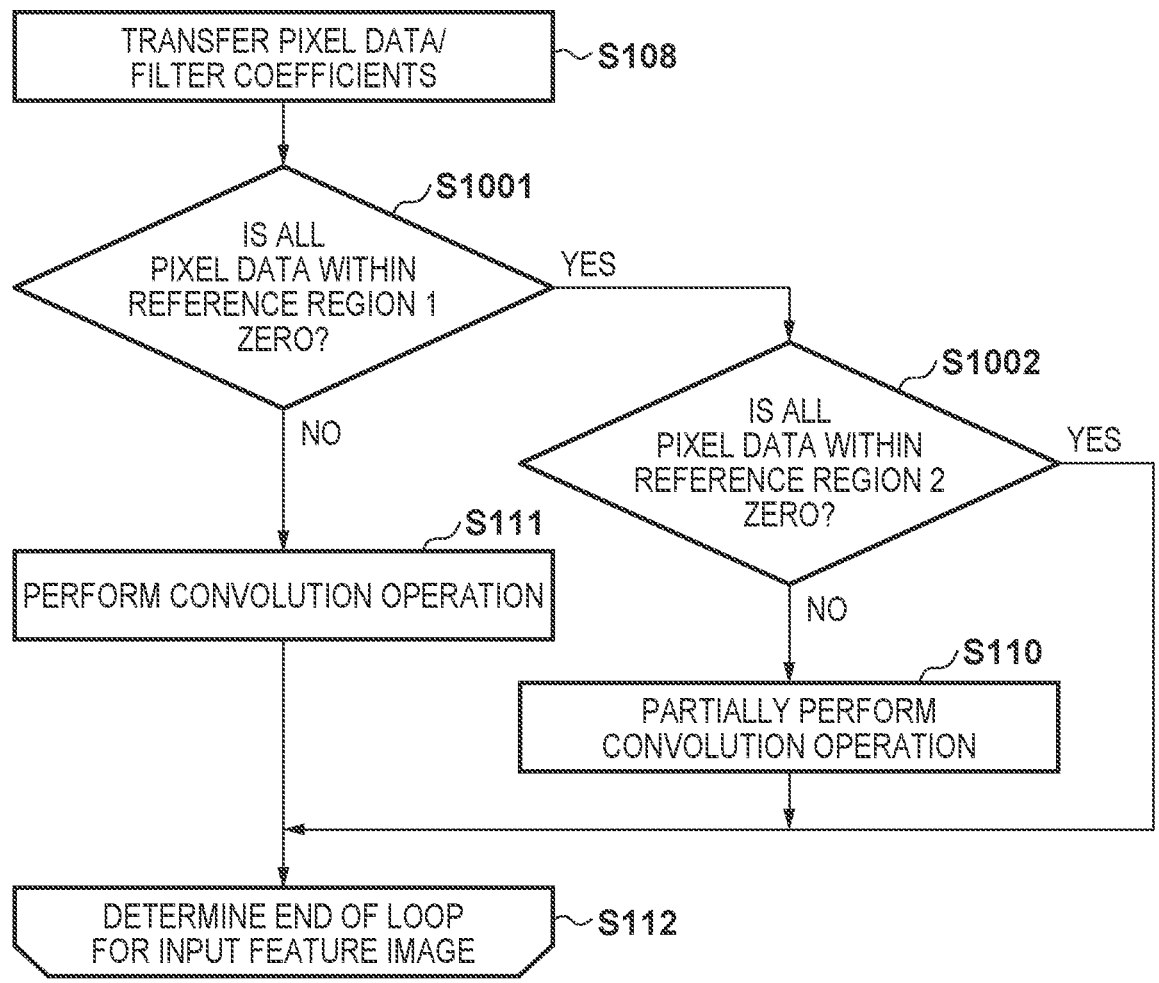
FIG. 10 is a flowchart illustrating processing according to the embodiment.

In this case, instead of the processing in step S109 of FIG. 1B, processes in steps S1001 and S1002 can be performed, as shown in FIG. 10. A case in which two reference regions shown in FIGS. 11A and 11B are used will be described below. Similar to the reference region in the above-described embodiment, a first reference region 1121 has a size smaller than that of a feature image block 1101 of an input feature image. A second reference region 1122 has the same size as that of the feature image block 1101 of the input feature image. The first reference region 1121 is included in the second reference region 1122. In this example as well, assume that filter processing using a filter with a size of 3×3, is performed similar to FIGS. 6A to 6C.

In step S1001 performed after step S108, the zero determination unit 409 determines whether all pixel data in the first reference region of the input feature image are zero. If all the pixel data in the first reference region are zero, the process advances to step S1002; otherwise, the process advances to step S111 and a convolution operation is performed.

In step S1002, the zero determination unit 409 determines whether all pixel data in the second reference region of the input feature image are zero. If all the pixel data in the second reference region are zero, a convolution operation result is zero, and thus the process advances to step S112. In this case, the convolution operation is omitted. As described above, if, with respect to the reference region having the same size as that of the feature image block, it is determined that the data in the reference region are zero values, the convolution processing unit 407 acquires a zero value as a convolution operation result without performing any multiply-accumulate operations. In this case, the number of multiply-accumulate operations corresponding to the second reference region is 0.

If it is not determined that all the pixel data in the second reference region of the input feature image are zero, the process advances to step S110. In this case, it is determined that all the pixel data in the first reference region are zero but it is not determined that all the pixel data in the second reference region are zero. In step S110, a convolution operation result is calculated by partially performing a convolution operation, similar to the above-described embodiment. In this case, it is possible to acquire a convolution operation result, similar to FIGS. 6A to 6C. In the case of FIG. 6A, the number of multiply-accumulate operations corresponding to the first reference region is 3.

When the processing is performed in accordance with the flowchart shown in FIGS. 1A-1i, even if all the pixel data in the feature image block 1101 have zero values, a convolution operation is partially performed to obtain a convolution operation result. On the other hand, when the processing is performed in accordance with the flowchart shown in FIG. 10, if all the pixel data in the feature image block 1101 have zero values, the process advances from step S1001 to step S1002. Since it is determined in step S1002 that all the data in the second reference region are zero, a convolution operation is omitted when obtaining a convolution operation result. On the other hand, if the feature image block shown in FIG. 6A or 7A is processed, a complete or partial convolution operation is performed in step S110 or S111. As described above, by determining whether the pixel data in the second reference region, that is, the feature image block of the input feature image are zero values, the whole convolution operation can be omitted in the filter processing, thereby reducing the calculation cost. On the other hand, with this arrangement, it is also possible to partially perform the convolution operation, and it is thus possible to further reduce the calculation cost.

Figure 13A:
FIGS. 13A to 13D are views each showing an example of a reference region.
Figure 13B:
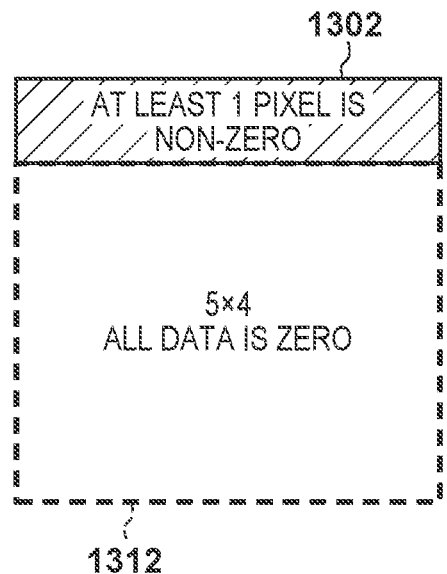

Furthermore, a plurality of reference regions smaller than the feature image block of the input feature image may be used. For example, FIGS. 13A to 13D show an example of performing the filter processing using a filter with a size of 3×3 for a feature image block with a size of 5×5, similar to FIG. 5A. As shown in FIG. 13A, if all pixel data in a reference region 1312 with a size of 5×5 in a feature image block 1301 have zero values, a convolution operation can be omitted in the filter processing. On the other hand, if it is not determined that all pixel data in a reference region 1311 have zero values, the smaller reference region 1312 can be used, as shown in FIG. 13B. That is, if all pixel data in the reference region 1312 with a size of 5×4 in a feature image block 1302 are zero values, multiply-accumulate operations can be performed using only the pixel data in the uppermost line of each kernel. Similarly, if it is not determined that all the pixel data in the reference region 1312 have zero values, a smaller reference region 1313 can be used, as shown in FIG. 13B. That is, if all pixel data in the reference region 1313 with a size of 5×3 in a feature image block 1303 have zero values, multiply-accumulate operations can be performed using only pixel data in the upper two lines of each kernel. Furthermore, if it is not determined that all the pixel data in the reference region 1313 have zero values, multiply-accumulate operations are performed using all the pixel data of each kernel.

As described above, the number of multiply-accumulate operations for obtaining a convolution operation result can be changed in accordance with whether all the pixel data in the reference region have zero values. The number of multiply-accumulate operations for obtaining a convolution operation result can be changed in accordance with the reference region where all the pixel data are determined to have zero values. The order of multiply-accumulate operations using the respective pixel data may be changed in accordance with the reference region where all the pixel data are determined to have zero values.

Figure 13C:
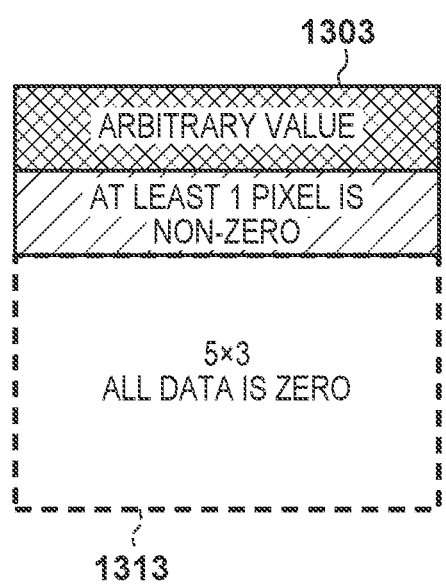
Figure 13D:
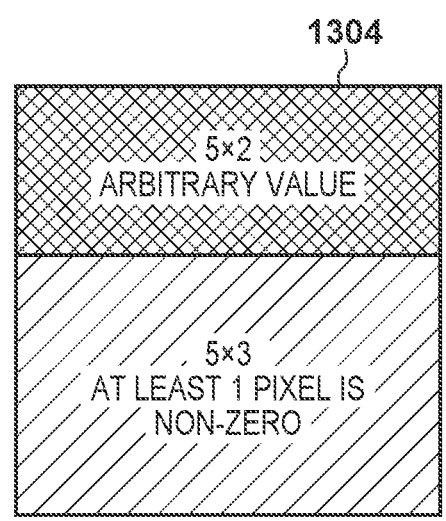

The processing time of the convolution operation is shortest in the case of FIG. 13A, is longer in the case of FIG. 13B, is further longer in the case of FIG. 13C, and is longest in the case of FIG. 13D. The controller 401 can determine which of the above cases corresponds to the feature image block, and determine the processing time of the convolution operation by each convolution processing unit 412 based on the determination result. In this case, the convolution processing unit 407 can acquire necessary pixel data and filter coefficients based on a control signal from the controller 401 at a timing corresponding to the determined processing time, thereby obtaining a convolution operation result. By using a plurality of reference patterns, it is possible to increase the probability of omitting multiply-accumulate operations for the feature image having various distributions.

Figure 8A:
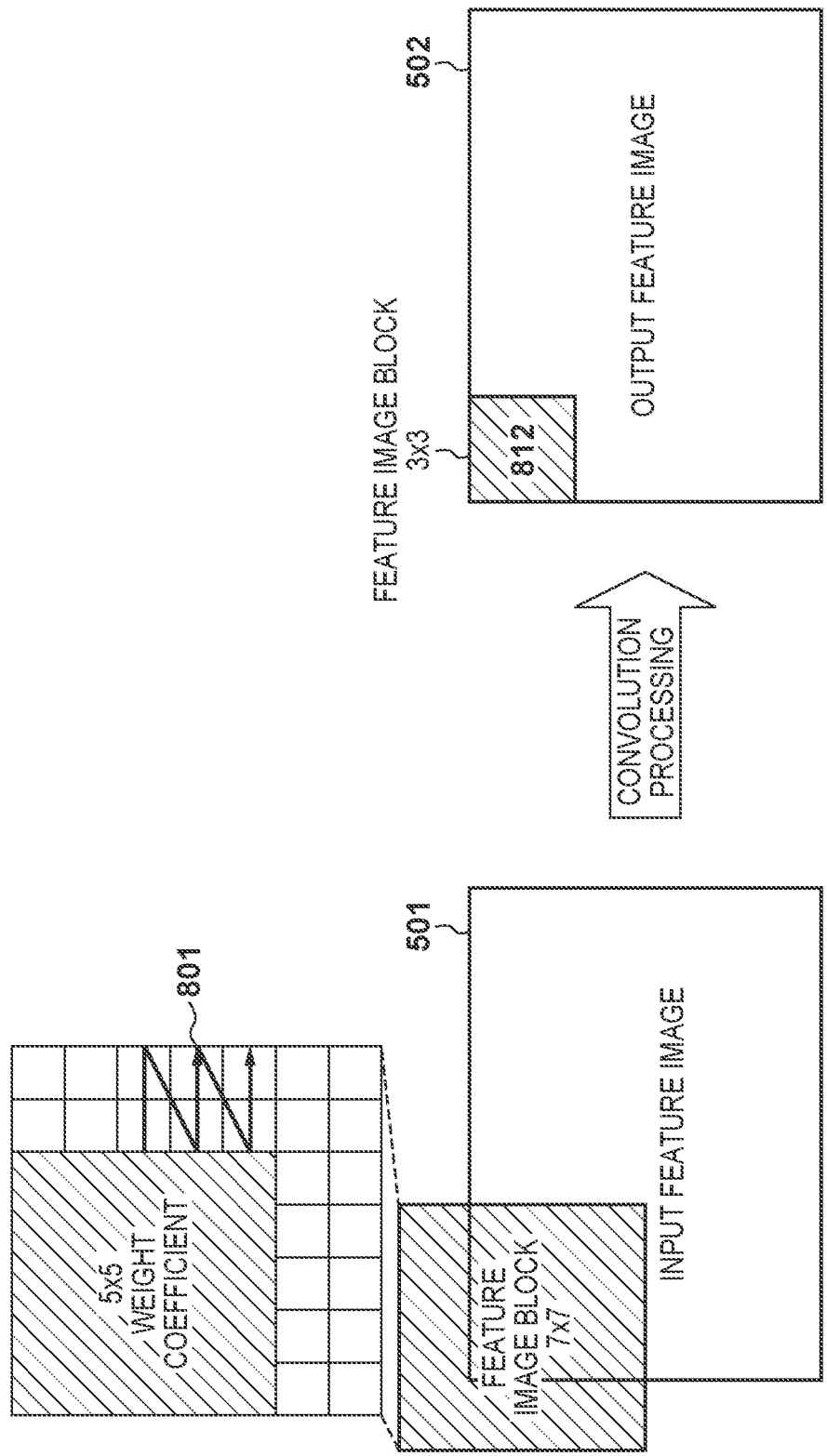
FIGS. 8A and 8B are views respectively showing examples of convolution processing and a reference region.

The above-described processing is also applicable to a case in which the size of the feature image block and the filter size are different. FIG. 8A shows an example in which the preceding layer is layer 2 (the filter size is 5×5). In this example, the size of the feature image block of the input feature image is adjusted so that the size of the feature image block of the output feature image is 3×3. More specifically, if the filter size is M×M and the size of the feature image block of the output feature image is Y×Y, the size of the feature image block of the input feature image can be set to (Y+M−1)×(Y+M−1). Note that the size of the feature image block of the output feature image can be set to a value equal to or smaller than the number of convolution processing units 412. In this case, the plurality of convolution processing units 412 can calculate the pixel data of the respective pixels of the feature image block of the output feature image in parallel.

Figure 8B:
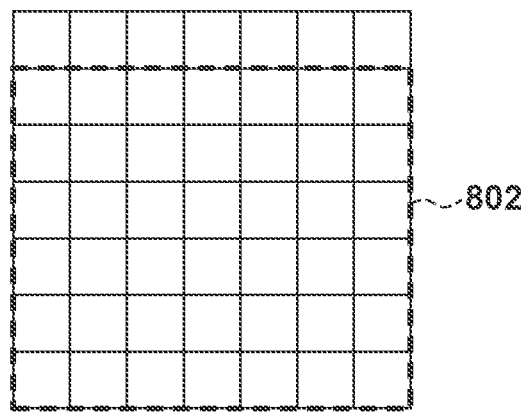

In the filter processing shown in FIG. 8A, the filter with a size of 5×5 is used, and thus the kernel size is 5×5. The input feature image 501 is divided into a plurality of feature image blocks 801, and they are sequentially processed. Each feature image block 801 includes 7×7 pixel data. By performing the filter processing (and further processing such as activation processing) using the feature image block 801, a feature image block 812 of the output feature image 502 is obtained. The feature image block 812 includes 3×3 pixel data. FIG. 8B shows a reference region 802 with a size of 7×6 as a region surrounded by dotted lines. In this example, if it is determined in step S109 that all pixel data in the reference region 802 have zero values, multiply-accumulate operations using the pixel data in the uppermost line of each kernel are performed in the filter processing. Note that the size of the reference region can be set to 7×7, 7×5, 7×4, or 7×3.

Figure 9A:
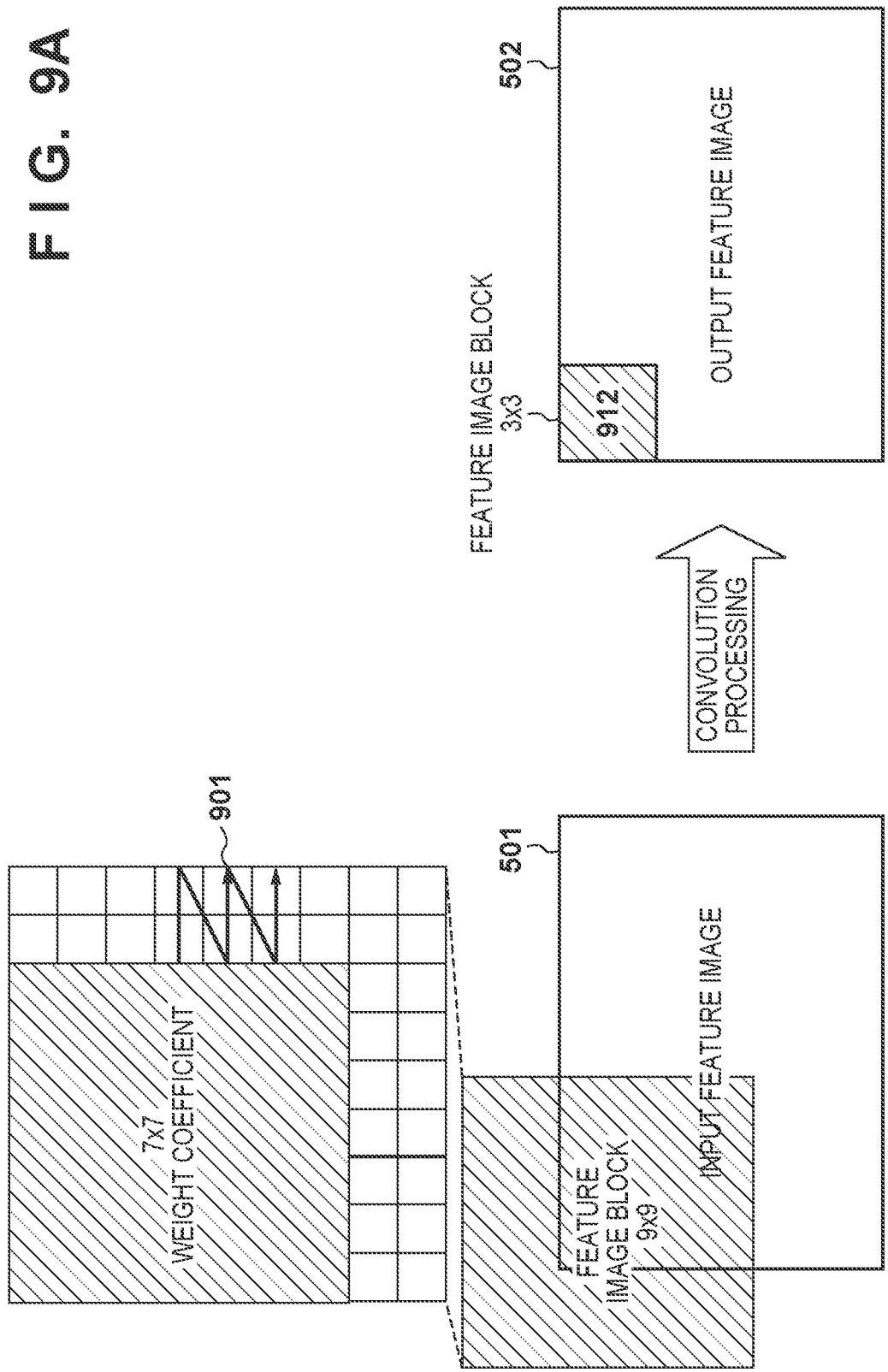
FIGS. 9A and 9B are views respectively showing examples of convolution processing and a reference region.
Figure 9B:
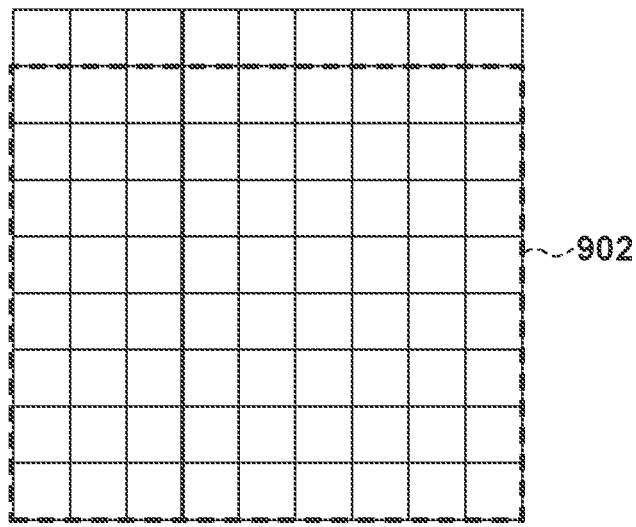

FIG. 9A shows an example in which the preceding layer is layer 3 (the filter size is 7×7). The input feature image 501 is divided into a plurality of feature image blocks 901, and they are sequentially processed. Each feature image block 901 includes 9×9 pixel data. By performing the filter processing (and further processing such as activation processing) using the feature image block 901, a feature image block 912 of the output feature image 502 is obtained. The feature image block 912 includes 3×3 pixel data. FIG. 9B shows a reference region 902 with a size of 9×8 as a region surrounded by dotted lines. In this example, if it is determined in step S109 that all pixel data in the reference region 902 have zero values, multiply-accumulate operations using the pixel data in the uppermost line of each kernel are performed in the filter processing. Note that the size of the reference region can be set to 9×9, 9×7, 9×6, 9×5, 9×4, or 9×3.

As described above, it is possible to omit some multiply-accumulate operations in the filter processing by determining whether the data in the reference region are zero values regardless of the filter size.

In this embodiment, a reference region corresponding to a processing target block may be determined in advance but the reference region setting unit 406 may decide a reference region. For example, the reference region setting unit 406 can decide a reference region based on the size of the processing target block and the filter size. As an example, the reference region setting unit 406 can decide, as a reference region, a region obtained by excluding the uppermost row of the feature image block of the input feature image. If the data in the reference region are zero values, multiply-accumulate operations using the uppermost row of each kernel are performed in the filter processing, and multiply-accumulate operations using the remaining rows of each kernel can be omitted, similar to FIGS. 6A to 6C. Furthermore, the reference region setting unit 406 can decide, as a reference region, a region obtained by excluding the upper N rows (N<M if the filter size is M×M) of the feature image block of the input feature image. If data in the reference region are zero values, multiply-accumulate operations using the upper N rows of each kernel are performed in the filter processing, and multiply-accumulate operations using the remaining rows of each kernel can be omitted.

In this specification, the reference region is a rectangular region set on the lower side in the feature image block. However, a reference region setting method is not limited to this. For example, a reference region may be a region obtained by excluding the leftmost column of the feature image block of the input feature image. If data in the reference region are zero values, multiply-accumulate operations using the leftmost column of each kernel are performed, and multiply-accumulate operations using the remaining columns of each kernel can be omitted.

As described with reference to FIGS. 5B and 5C, as the reference region is larger, the calculation cost can be reduced more largely, but as the reference region is smaller, the probability that the data in the reference region are zero values is higher. To cope with this, the reference region setting unit 406 may select a reference region in accordance with an input data array (feature image). For example, the reference region setting unit 406 can set a larger reference region if the occurrence frequency of zero values in the feature image is higher, and set a smaller reference region if the occurrence frequency is lower. In this way, the reference region setting unit 406 may select, in accordance with the input data array, a reference region so that the processing time is shortest or the calculation cost can be reduced most.

In the above-described embodiment, the zero determination unit 409 determines whether the data in the reference region of the processing target block are zero values. On the other hand, when calculating the feature images of the preceding layer, whether the data after the activation processing are zero values may be recorded. In this case, when calculating the feature images of the next layer, the zero determination unit 409 may determine based on the record whether the data in the reference region are zero values. When the data array in processing target block is stored in the feature data memory 405 or the data memory 402, the zero determination unit 409 may determine whether the data in the reference region are zero values. For example, when the feature image is stored in the feature data memory 405 or the data memory 402, the zero determination unit 409 can determine whether the data in the reference region are zero values. This determination result can be referred to when performing the filter processing on the processing target block. For example, the zero determination unit 409 may calculate a region where the pixel data are zero values, based on the positions of the zero values in the feature image. Then, by comparing this region with the reference region, the zero determination unit 409 may determine whether the data in the reference region are zero values.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-186520, filed Nov. 16, 2021, which is hereby incorporated by reference herein in its entirety.

What is claimed is:

1. An apparatus for performing filter processing on a data array in a processing target block of a predetermined size, comprising:
a data memory configured to hold the data array in the processing target block;
a coefficient memory configured to hold weight coefficients of a filter used for the filter processing;
a controller configured to determine, in a determination, whether data in a reference region in the processing target block, set in correspondence with the processing target block, are zero values; and
a processor configured to generate a convolution operation result of the weight coefficients and data at a plurality of positions in the processing target block,
wherein the controller controls, based on a result of the determination, whether to perform at least some of multiply-accumulate operations of the data and the weight coefficients when the processor generates the convolution operation result.

2. The apparatus according to claim 1, wherein in a case where the controller determines that the data in the reference region are zero values, the processor omits at least some of the multiply-accumulate operations of the data at the plurality of positions in the processing target block and the weight coefficients.

3. The apparatus according to claim 1, wherein at least one reference region is set, and at least one of the at least one reference region is smaller than the processing target block.

4. The apparatus according to claim 1, wherein
in a case where the controller determines that the data in the reference region are zero values, the processor acquires the convolution operation result by first processing with respect to a position in the processing target block, and
in a case where the controller does not determine that the data in the reference region are zero values, the processor acquires the convolution operation result by second processing with respect to a position in the processing target block.

5. The apparatus according to claim 1, wherein
in a case where the controller determines that the data in the reference region are zero values, the processor acquires the convolution operation result by common first processing with respect to all the plurality of positions in the processing target block, and
in a case where the controller does not determine that the data in the reference region are zero values, the processor acquires the convolution operation result by common second processing with respect to all the plurality of positions in the processing target block.

6. The apparatus according to claim 4, wherein the first processing and the second processing are processes of acquiring the convolution operation results respectively by multiply-accumulate operations the numbers of which are different from each other.

7. The apparatus according to claim 4, wherein
the first processing is processing of acquiring the convolution operation result by multiply-accumulate operations the number of which is smaller than the number of weight coefficients, and
the second processing is processing of acquiring the convolution operation result by multiply-accumulate operations the number of which is equal to the number of weight coefficients.

8. The apparatus according to claim 1, wherein
the controller determines, for each of a plurality of reference regions, whether data in the reference region are zero values, and
in a case where the controller determines that data in a specific reference region are zero values, the processor acquires, with respect to a position in the processing target block, the convolution operation result by multiply-accumulate operations the number of which corresponds to the specific reference region.

9. The apparatus according to claim 8, wherein
the controller determines, for a reference region with the same size as the processing target block, whether data in the reference region are zero values, and
in a case where the controller determines that the data in the reference region with the same size as the processing target block are zero values, the processor acquires a zero value as the convolution operation result without performing any multiply-accumulate operations.

10. The apparatus according to claim 1, wherein the controller controls supply of the data from the data memory to the processor based on a result of the determination.

11. The apparatus according to claim 1, wherein
the processor includes a plurality of multiply-accumulate operators, and
the plurality of multiply-accumulate operators are configured to perform multiply-accumulate operations in parallel with respect to the plurality of positions in the processing target block.

12. The apparatus according to claim 11, wherein the plurality of multiply-accumulate operators perform multiply-accumulate operations of respectively input data and a common weight coefficient in parallel.

13. The apparatus according to claim 12, wherein
in a case where the controller does not determine that the data in the reference region are zero values, the plurality of multiply-accumulate operators use a plurality of weight coefficients to sequentially perform multiply-accumulate operations of the data and the weight coefficients, and
in a case where the controller determines that the data in the reference region are zero values, the plurality of multiply-accumulate operators use not all but some of the plurality of weight coefficients to sequentially perform multiply-accumulate operations of the data and the weight coefficients.

14. The apparatus according to claim 1, wherein the controller is configured to set the reference region based on the size of the processing target block and a size of the filter.

15. The apparatus according to claim 1, wherein the processor is further configured to perform activation processing on a result of the filter processing.

16. The apparatus according to claim 1, wherein the controller is further configured to, in response to the data array in the processing target block being stored in the data memory, determine whether the data in the reference region are zero values.

17. The apparatus according to claim 1, wherein
the filter processing performs processing using a convolutional neural network,
the data array is a feature image processed using the convolutional neural network, and
the weight coefficients are some of weight coefficients of the convolutional neural network.

18. A method of performing filter processing on a data array in a processing target block of a predetermined size, comprising:
determining, in a determination, whether data in a reference region in the processing target block, set in correspondence with the processing target block, are zero values;
controlling, based on a result of the determination, whether to perform at least some of multiply-accumulate operations of the data and weight coefficients of a filter used for the filter processing in generating a convolution operation result; and
generating a convolution operation result of the data and the weight coefficients at a plurality of positions in the processing target block in accordance with the control.

19. A non-transitory computer-readable medium storing one or more programs which, when executed by a computer comprising one or more processors and one or more memories, cause the computer to:
determine, in a determination, whether data in a reference region in a processing target block, set in correspondence with the processing target block, are zero values;
control, based on a result of the determination, whether to perform at least some of multiply-accumulate operations of the data and weight coefficients of a filter used for a filter processing in generating a convolution operation result; and
generate a convolution operation result of the data and the weight coefficients at a plurality of positions in the processing target block in accordance with the control.

* * * * *